Sept. 14, 1926.
F. R. KLAUS
1,599,771
APPARATUS FOR MAKING CUSHION TIRES
Filed Feb. 16, 1923
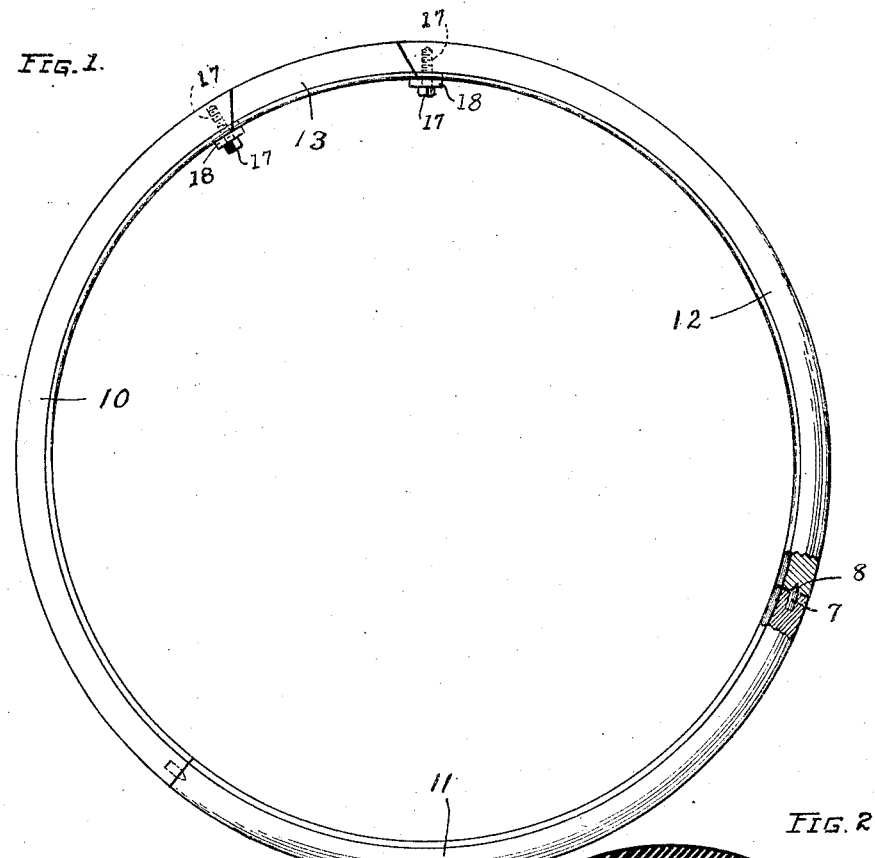
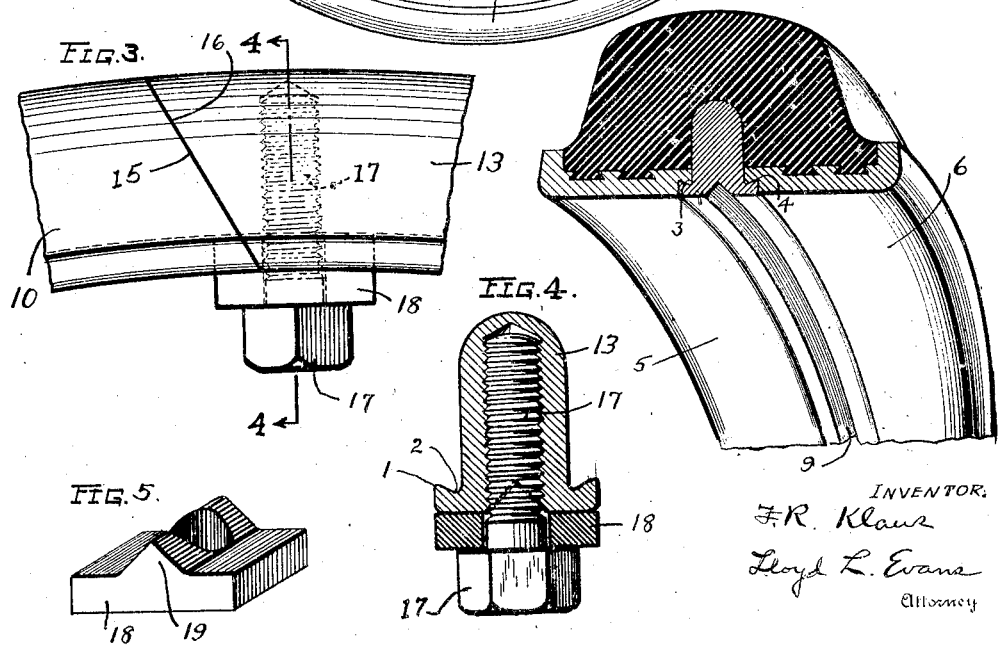
INVENTOR.
F. R. Klaus
Lloyd L. Evans
Attorney Patented Sept. 14, 1926.

1,599,771

UNITED STATES PATENT OFFICE.

FRED R. KLAUS, OF WARREN, OHIO.

APPARATUS FOR MAKING CUSHION TIRES.

Application filed February 16, 1923. Serial No. 619,336.

This invention relates to the art of making tires having a metal base to which a rubber tire is fastened during the process of manufacture.

Its principal object is to provide an improved core adapted to be removably secured to the tire base for molding a channel or recesses in the inner wall of the tire to make what is commercially known as a cushion tire.

An object of the invention is to provide a core that can be easily inserted between the side members of the metal tire base and which fills the opening between them entirely around the base to form a strong, substantially unitary structure and to prevent the uncured rubber from escaping between the core and side members when the rubber is pressed by the mold parts for vulcanizing.

My construction provides for easily and quickly securing the core sections into full engagement with the tire base members so that a rigid ring construction is formed on which the uncured rubber may be positioned and the tire mold sections may be brought together with considerable pressure as is customary without affecting the rigidity of the base members and core, for my core when expanded into full engagement with the tire base members will withstand considerable pressure. In addition, the tire mold members usually are constructed to support or prevent radial movement inwardly of the core sections, but with many common designs of tire molds this support for the core is not effective until after considerable pressure has been transmitted to the core through the rubber, thus tending to displace the core and the rubber.

It will be seen that the entire space between the base sections is filled before the tire mold sections are pressed together around the uncured rubber. With this construction the uncured rubber is held in the proper position for curing and none of the rubber is displaced, for it cannot escape into the space between the tire base members. It is objectionable to have a core construction permitting the rubber to flow between the base members both because it prevents the complete and proper engagement between the core sections and the base members (if core sections are used which are pushed radially outward into position by movement together of the tire mold sections), and also because any rubber that is displaced becomes vulcanized and has to be trimmed in a subsequent operation before the locking ring for tying the base members together can be applied.

In the accompanying drawings forming a part of this specification,

Figure 1 is a view partly in section of the core ring.

Fig. 2 is a fragmentary view, partly in section, showing the core ring in place but not showing the tire mold sections.

Fig. 3 is an enlarged view of a portion of the core ring.

Fig. 4 is a section on line 4—4, Fig. 3.

Fig. 5 is a perspective view of one of the washers.

In my construction a plurality of core sections are used, each being preferably T-shaped in cross section and having ribs 1 and grooves 2 to fit corresponding grooves 3 and ribs 4 in the adjacent side sections 5 and 6 of the tire base. The core sections form a ring, the abutting ends being interlocked by any suitable means such as a pin 7 in the end of one section engaging a recess 8 in the end of the other section. The core sections are provided with groove 9 along their inner faces.

The core may be formed of any convenient number of sections. As shown in the drawing, the core is made up of four sections. The sections 10, 11 and 12 are of sufficient length to nearly complete the annular ring, the remainder of the ring being formed by the relatively shorter section 13 which serves as the key section. The ends of section 13 are beveled to overlap radially similarly beveled ends of the adjacent sections 10 and 12, Fig. 3 showing the overlapping beveled faces 15, 16 of the sections 10 and 13 respectively. The key section 13 may be secured in place to form a complete ring by any suitable means such as the screws 17 which engage threaded recesses in the adjacent sections 10 and 12. Washers 18 of sufficient length to overlap and have a substantial bearing against the ends of the core section 13 are carried by the screws 17 which firmly secure them in place. The washers 18 each have a rib 19 to fit the groove 9.

By tightening the screws 17 and forcing the section 13 into complete engagement with the tire base members, it will be seen that the core sections as a whole are forced radially outwardly into complete engagement with the tire base members and that the entire structure is rendered substantially rigid and self-supporting. The core sections and the base members are thus securely held together in accurate postion and interlocked to prevent relative movement of the sections or members during the application of pressure by the tire molds to the uncured rubber on the base members, or during the vulcanizing operation.

It is obvious that after curing the rubber the section 13 may be easily taken out by removing the screws 17 and the other sections of the core disassembled, leaving the side members ready for the insertion of a locking ring of any suitable design (not shown) before mounting on the tire on a vehicle wheel.

The ribs 1 of the core sections and the grooves 3 of the base members are preferably dovetailed or undercut at a relatively large angle so that forcing the key section of the core into position causes the side edges of the base members to engage the body of the core sections so that the spacing between the base members is filled throughout their circumference.

It will also be seen that the core can be easily secured in final position before the tire molds are clamped around the tire section so that there will be no opportunity for the unvulcanized rubber to become displaced or to flow into the opening between the base members.

Furthermore, it is to be understood that the particular forms of apparatus shown and described, and the particular procedure set forth, are presented for purposes of explanation and illustration and that various modification of said apparatus and procedure can be made without departing from my invention as defined in the appended claims.

What I claim is:

1. Apparatus for building cushion tires comprising a tire base, including annular side members, a substantially continuous core structure formed of sections withdrawable from said base, said core sections having means to engage the tire base members to prevent relative lateral movement thereof, and removable means for holding the core sections in engagement with each other and with the base members around their circumference.

2. Apparatus for making cushion tires comprising a pair of spaced tire base members, an annular core composed of a plurality of sections, means on each section to interlock with the adjacent edges of the base members, the body of the core projecting through the space between said members, means on the ends of a plurality of core sections to lock them against relative movement, and means for removably securing a core section in place to complete a substantially rigid, annular core structure engaging the base members.

3. Apparatus for manufacturing cushion tire structures comprising a pair of separately formed annular base members spaced apart and an annular sectional core having its inner diameter substantially equal to the inner diameter of the tire base sections and adapted to interlock therewith and having its body portion filling the opening between said base members and projecting outwardly therefrom, said core being solely supported in interlocked assembled position by the base members.

4. Apparatus for making cushion tire structures which comprises annular base members spaced apart, an annular sectional core, complementary tongues and grooves formed on the base members and core sections means on the ends of a plurality of the core sections for holding them against relative movement, and means for forcing said core sections radially outwardly whereby a rigid core ring is formed which interlocks with the base members and fills the opening between them to prevent the displacement of the uncured rubber when pressure is applied by the mold sections to the rubber on the base members.

5. Apparatus for making a cushion tire body comprising spaced annular metal base members to receive a tire, a sectional core, said core sections and base members having interlocking means to hold them against relative movement, and a key section removably secured to the adjacent sections for expanding the core ring, whereby a rigid annular core structure is formed.

6. Apparatus for manufacturing cushion tire structures which consists of spaced annular metal base members and a core, said core comprising a plurality of sections having a body portion and means to engage the base members to prevent relative lateral movement thereof, the body portion of the core sections filling the opening between the base sections and projecting outwardly, said core consisting of sections removably secured together to form a substantially rigid annular ring.

7. Apparatus for making cushion tires comprising spaced annular metal base members to receive a tire, an annular core composed of a plurality of sections each having a body portion to fill the opening between the base sections and having means to engage the base members, means on the ends of a plurality of the core sections to lock them against relative movement, and means for removably securing the core sections in place to complete a substantially rigid, annular core structure engaging the base members.

8. Apparatus for manufacturing cushion tire structures comprising a pair of separately formed annular base members spaced apart, and a demountable annular core having its inner diameter substantially equal to the inner diameter of the tire base sections and adapted to interlock therewith and having its body portion filling the opening between said base members and projecting outwardly therefrom, said core being solely supported in interlocked assembled position by the base members.

In testimony whereof, I hereunto affix my signature.

FRED R. KLAUS.